United States Patent
Lazzaro et al.

(10) Patent No.: US 8,347,269 B2
(45) Date of Patent: Jan. 1, 2013

(54) METHOD, SYSTEM AND COMPUTER PROGRAM FOR DEBUGGING SOFTWARE APPLICATIONS IN A WEB ENVIRONMENT

(75) Inventors: Luca Lazzaro, Naples (IT); Marco Lerro, Rome (IT); Roberto Longobardi, Rome (IT); Claudio Marinelli, Latina (IT)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 12/166,762

(22) Filed: Jul. 2, 2008

(65) Prior Publication Data
US 2009/0089761 A1    Apr. 2, 2009

(30) Foreign Application Priority Data
Sep. 28, 2007 (EP) .................................. 07117538

(51) Int. Cl.
*G06F 9/44* (2006.01)
(52) U.S. Cl. ......................................... 717/128
(58) Field of Classification Search .................. None
See application file for complete search history.

(56) References Cited

U.S. PATENT DOCUMENTS

| 7,739,282 | B1 * | 6/2010 | Smith et al. | 707/736 |
| 2002/0049746 | A1 * | 4/2002 | De Roose | 707/1 |
| 2003/0229827 | A1 * | 12/2003 | Dun et al. | 714/48 |
| 2005/0132337 | A1 * | 6/2005 | Wedel et al. | 717/128 |
| 2009/0089629 | A1 * | 4/2009 | Hawkins | 714/100 |

* cited by examiner

*Primary Examiner* — Philip Wang
(74) *Attorney, Agent, or Firm* — Stephen Bongini; Fleit Gibbons Gutman Bongini & Bianco PL (57) ABSTRACT

A method and system are provided for debugging a software application in a data processing system that includes a server entity and client entities. For at least one of the client entities, a server component of the application running on the server entity is accessed, and a client component of the application is downloaded from the server entity. The client component is executed. Client log information relating to the execution of the client component is saved by invoking a log function provided by the client component; the client log information is saved into a non-persistent memory structure of the client component. The client log information is transmitted for use in the debugging of the application.

17 Claims, 6 Drawing Sheets

METHOD, SYSTEM AND COMPUTER PROGRAM FOR DEBUGGING SOFTWARE APPLICATIONS IN A WEB ENVIRONMENT

CROSS-REFERENCE TO RELATED APPLICATIONS

This application is based upon and claims priority from European Patent Application No. 07 117 538.4, filed Sep. 28, 2007, the entire disclosure of which is herein incorporated by reference.

FIELD OF THE INVENTION

The present invention relates to data processing, and more specifically to the debugging of software applications in a data processing system.

BACKGROUND OF THE INVENTION

The debugging of software applications is a very critical activity. Generally, the debugging of any software application starts with the identification of errors that result in a malfunctioning thereof. A diagnostic analysis is carried out to determine the causes of these errors. The appropriate corrective actions are then taken to fix the errors (by either repairing them permanently or simply by-passing them temporarily).

Typically, the debugging leverages a tracing functionality of the software application. In this case, log information about the operations performed during the execution of the software application is saved into a log file. The analysis of this log information (in response to any errors) provides useful hints about the context in which the errors occurred. An example of a log file that is stored on web servers is disclosed in U.S. Patent Application No. 2005/0240620. Particularly, this document proposes a specific log file for voice-enabled web applications; the log file is based on the XML specification, so as to facilitate its analysis.

Debugging is one of the main activities during the development of any new software applications (in connection with their testing). However, debugging also continues after the software applications have been delivered. Indeed, the software applications are so complex, that is almost impossible to ensure that they work correctly in any production environments (especially when multiple software applications interact with them).

A problem is that the debugging of the software applications is sometimes very difficult in the production environment. A typical example is that of a software application with a client/server architecture, such as a web application. A web application includes a server component running on a server computer (or simply "server"), which is accessed by users of different client computers (or simply "clients") through corresponding browsers. The web applications have become very popular in the last few years, due to the ubiquity of the browsers. Another reason for the widespread diffusion of the web applications is the possibility of maintaining them without the need for performing any action on the clients.

Typically, modern web applications also include client components (such as JavaScripts or applets), which are downloaded on each client whenever it is necessary. The operation is controlled by the browser on which these client components are executed (and then discarded). As a result, part of the processing is performed locally on the clients, without any interaction with the server. This improves the performance of the web applications, and strongly reduces the network traffic (for the communications between the clients and the server).

However, the more complex the client components of any web application, the more difficult is its debugging. Indeed, in this case the client components can perform a long series of operations locally (without any interaction with the server component). Therefore, whenever an error is detected on the server following its occurrence on the client, no information is available on the server about the operations that were performed by the client components.

In this context, it is very difficult (if not impossible) to implement any tracing of the web application on the client. Indeed, security constraints generally prevent the client components (running in the browser) from writing to the mass memory of the client. Therefore, it is not possible to save log information about the operations performed during the execution of the client components into any log file.

This has a detrimental impact on the quality and reliability of the web applications.

SUMMARY OF THE INVENTION

In general, the present disclosure is directed to using a non-persistent memory structure for logging information locally.

One aspect of the present invention provides a method for debugging a software application (such as a web application) in a data processing system, which includes a server entity and multiple client entities. For at least one of the client entities, a server component of the application running on the server entity is accessed, and a client component of the application (such as one or more JavaScripts) is downloaded from the server entity. The client component is executed. Client log information relating to the execution of the client component is saved by invoking a log function provided by the client component; the client log information is saved into a non-persistent memory structure of the client component (such as a buffer). The client log information is transmitted (such as to the server entity), for use in the debugging of the application.

Another aspect of the invention provides a computer program for performing such a method.

A further aspect of the invention provides a corresponding system.

BRIEF DESCRIPTION OF THE DRAWINGS

The present invention itself, as well as further features and the advantages thereof, will be best understood with reference to the following detailed description, given purely by way of a non-restrictive indication, to be read in conjunction with the accompanying drawings, in which.

DETAILED DESCRIPTION OF THE PREFERRED EMBODIMENTS

Preferred embodiments of the present invention will be described in detail hereinbelow with reference to the attached drawings.

Embodiments of the present invention provide a method for debugging a software application (such as a web application) in a data processing system, which includes a server entity and multiple client entities. For at least one of the client entities, a server component of the application running on the server entity is accessed, and a client component of the application (such as one or more JavaScripts) is downloaded from the server entity. The client component is executed. Client log information relating to the execution of the client component is saved by invoking a log function provided by the client component; the client log information is saved into a non-persistent memory structure of the client component (such as a buffer). The client log information is transmitted (such as to the server entity), for use in the debugging of the application.

In one embodiment, the client log information is transmitted to the server entity and combined with server log information relating to execution of the server component.

In some embodiments, the method is applied to a web application in which the client component includes scripts (associated with web pages) that are executed under the control of a browser.

For example, in one embodiment the client log information relates to user actions performed on the client entity and to functional operations performed by the client component.

In one embodiment, the scripts are executed in response to the detection of registered actions by the browser (which actions are then logged).

In some embodiments, the client log information is transmitted periodically.

For example, in one embodiment there is registered the invocation (with a selected time-out) of a corresponding transmission function of the scripts with the browser.

The client log information may also be transmitted when an indicator of a filling rate of the memory structure reaches a threshold.

Moreover, the client log information may be transmitted in response to the detection of an error condition of the client component.

Another embodiment of the present invention provides a computer program for performing such a method.

A further embodiment of the present invention provides a system for performing such a method.

Exemplary embodiments of the present invention will now be described in detail with reference to FIGS. 1-4C.

Figure 1:
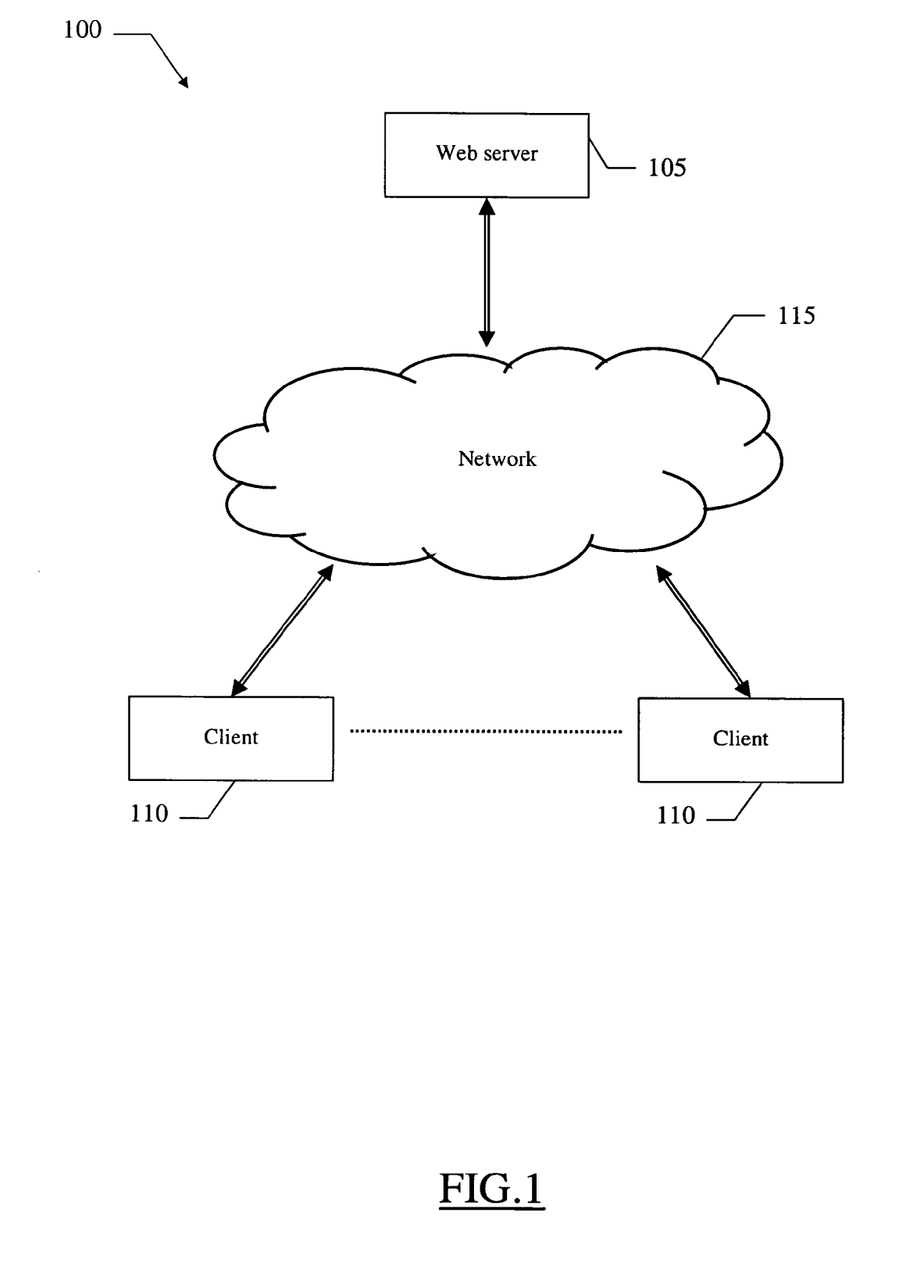
FIG. 1 is a block diagram of a data processing system to which embodiments of the present invention may be applied.

With reference to FIG. 1, a distributed data processing system 100 is illustrated. The system 100 has a client/server architecture, typically based on the Internet. The Internet consists of millions of servers; particularly, a subset of the servers—known as the World Wide Web (or simply "web")—allows accessing web sites hosted thereon. For the sake of simplicity, only one of those (web) servers 105 is represented in the figure. Each web site consists of a collection of web pages, which are linked to each other (starting from a home page), and possibly to web pages of other web sites. Each web page is a hypertext document (formatted in the HTML language), which is accessed through the HTTP protocol. For this purpose, the web page is identified and localized by a correspondent URL (Uniform Resource Locator), which consists of a string formatted according to a standard syntax.

Users of clients 110 access the Internet through computers that operate as access providers; particularly, the clients 110 access the server 105 so as to exploit the services offered by the web site hosted thereon. For this purpose, the server 105 and the clients 110 are interconnected through a global communication network 115.

Figure 2:
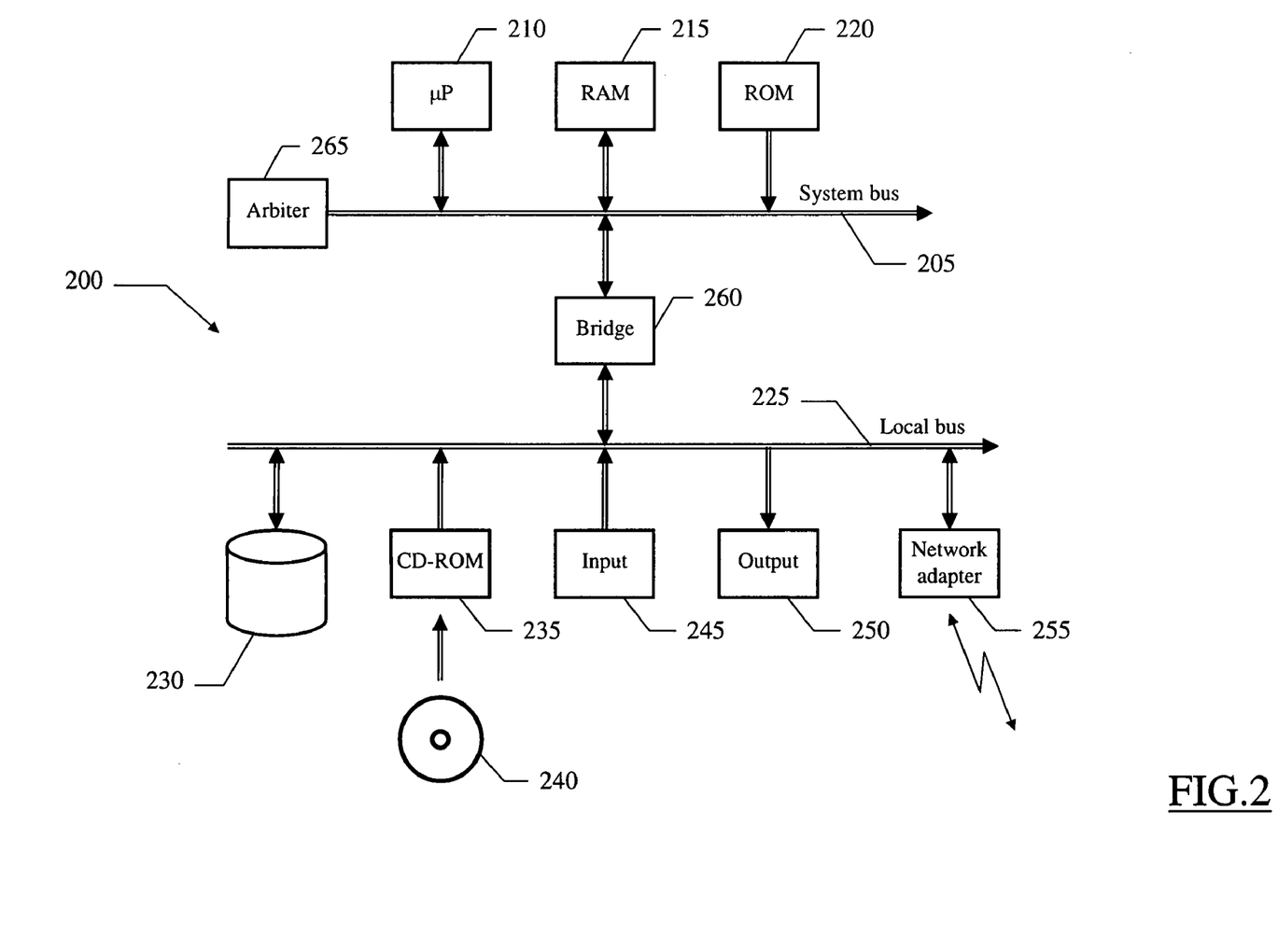
FIG. 2 shows the functional blocks of an exemplary computer of the system.

Moving to FIG. 2, a generic computer of the above-described system (server or client) is shown. The computer 200 is formed by several elements that are connected in parallel to a system bus 205 (with a structure that is suitably scaled according to the actual function of the computer 200 in the system). In detail, one or more microprocessors (µP) 210 control operation of the computer 200; RAM 215 is directly used as a working memory by the microprocessors 210, and ROM 220 stores basic code for a bootstrap of the computer 200. Several peripheral units are clustered around a local bus 225 (by respective interfaces). Particularly, a mass memory consists of one or more hard disks 230 and drives 235 for reading optical disks such as CD-ROMs 240. Moreover, the computer 200 includes input units 245 (for example, a keyboard and a mouse), and output units 250 (for example, a monitor and a printer). An adapter 255 is used to connect the computer 200 to the network. A bridge unit 260 interfaces the system bus 205 with the local bus 225. Each microprocessor 210 and the bridge unit 260 can operate as a master and request access to the system bus 205 for transmitting information. An arbiter 265 manages the granting of access with mutual exclusion to the system bus 205.

Figure 3:
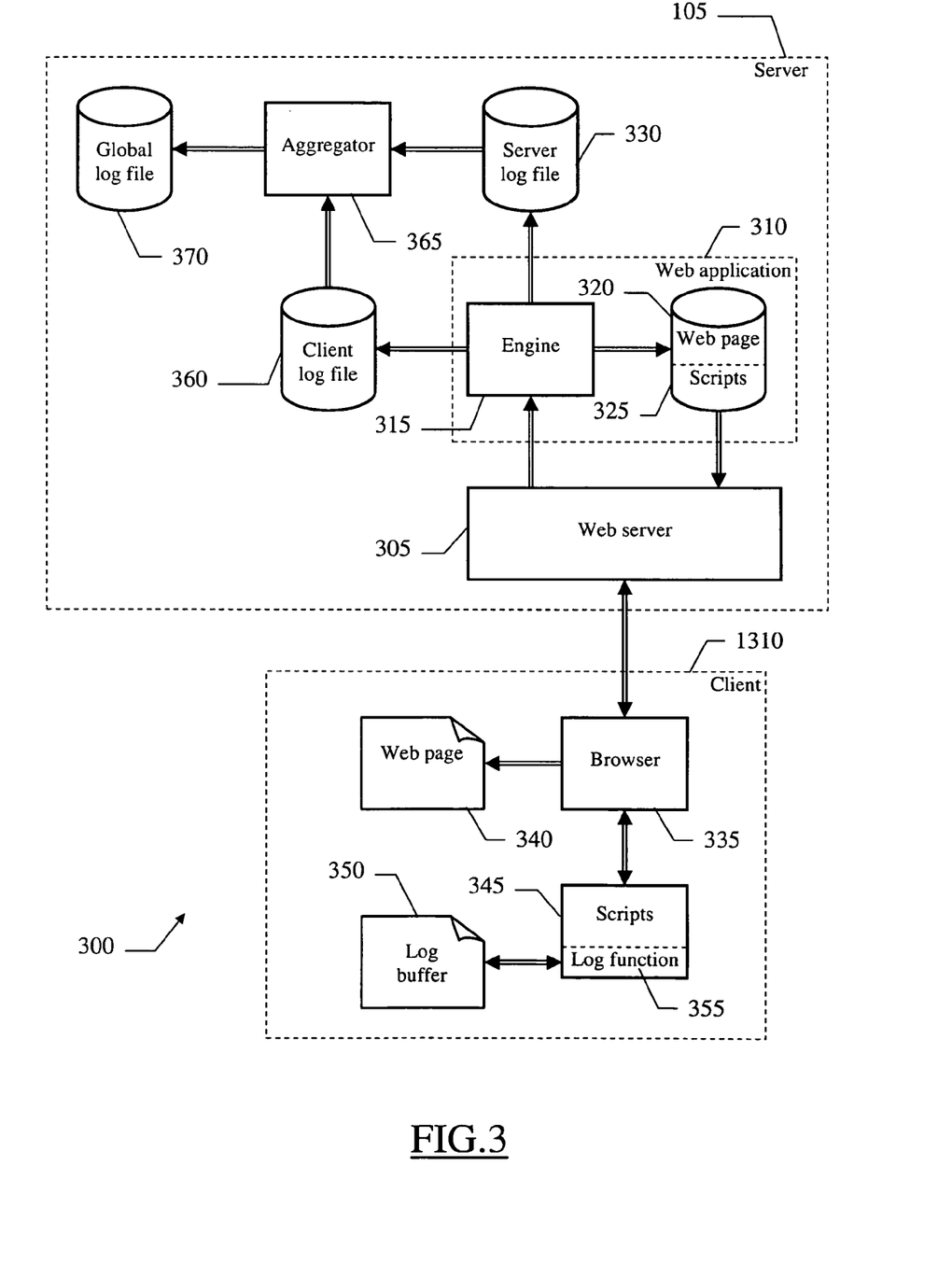
FIG. 3 illustrates software components that are used to implement an embodiment of the present invention.

Considering now FIG. 3, software components 300 that are used to implement an embodiment of the present invention are illustrated. The information (programs and data) is typically stored on the hard disk and loaded (at least partially) into the working memory of each computer when the programs are running, together with an operating system and other application programs. The programs are initially installed onto the hard disk, for example, from a CD-ROM.

A web server 305 processes any request that is submitted by the users of the different clients to the server 105 for accessing the web site(s) hosted thereon. The web server 305 interfaces with one or more web applications 310, which implement corresponding web sites. Each web application 310 offers a corresponding service; for example, the web application 310 may implement a web site for accessing databases, for downloading digital content, for playing on-line games, and so on. The web application 310 includes an engine 315; the engine 315 (for example, servlets, CGIs, and the like) implements a server component of the web application 310 running on the server 105 for serving the requests submitted by the users (through the web server 305).

In response to each request, the engine 315 returns a corresponding web page 320 to the relevant client. The web page 320 may be defined statically (in a respective repository); more commonly, however, the web page 320 is generated dynamically upon request by adding specific information required by the user to a template of the web page (extracted from a respective repository). Typically, the web page 310 is also associated with one or more scripts 325, which implement a client component of the web application 310 to be run directly on the client. For example, the scripts may be JavaScripts (commands embedded in the HTML definition of the web page 320), applets (external small programs identified in the HTML definition of the web page 320), and the like. In any case, the web page 320 (with the associated scripts 325) is returned to the client through the web server 305.

The engine 315 is instrumented to trace its execution, by saving server log information relating thereto into a corresponding server log file 330. Typically, the server log file 330 includes a series of server log items (for example, each one consisting of a line), which are added in succession by the engine 315 during its execution (such as whenever a request is received from a client, a function of the web application is invoked, an error condition is detected, and the like). For example, in one embodiment each server log item includes a timestamp, an identifier of the function requesting the logging, a possible error code, and the like.

Moving now to a generic client 110 (only one is shown in the figure for simplicity), a browser 335 is used to surf the Internet. Particularly, the browser 335 makes it possible to locate desired web pages (through their URLs), and then download them on the client 110 for their display. Moreover, the browser 335 allows the user to move quickly to other web pages (in the same web site or in a different one) by corresponding hyperlinks. The browser 335 natively supports (in addition to HTML) a variety of formats, such as JPEG for images; moreover, the browser 335 is typically provided with different plug-ins, which extend it to support additional formats (such as running JavaScripts, playing video, and the like). For each desired web page, the browser 335 submits a corresponding request to the respective server (as indicated in its URL). Once the web page is received by the browser 335, it is loaded by interpreting its HTML definition. This results in the rendering of the web page 340 into a window of the browser 335 that is opened on the monitor of the client 110; at the same time, any scripts 345 associated with the web page are loaded into its working memory.

The user can then interact locally with the web page 340 in different ways (for example, by entering data with the keyboard, by selecting commands with the mouse, and the like). Some of these (user) actions cause the execution of a corresponding script 345. For example, the script 345 can validate data entered by the user, can display an animation, and the like. Generally, the scripts 345 are executed in a sandbox, which provides a tightly controlled set of resources for their execution. For example, the scripts 345 cannot access a file system of the client, and particularly they cannot write files onto its mass memory. Other actions instead cause the transmission of a corresponding new request (together with any data entered by the user) to a respective server. For example, the user may request to move to another web page, may transmit a filled-in form, and the like.

According to an embodiment of the present invention, as described in detail in the following, the scripts 345 are instrumented to trace their execution, by saving (client) log information relating thereto. This log information is simply added to a log buffer 350 of the scripts 345. The log buffer 350 is maintained in the working memory of the client 110, or in a scratch area of its mass memory that is available to the browser 335. In other words, the log buffer 350 provides a non-persistent memory structure, which is bound to be deleted automatically (for example, when the browser 335 is closed or when the scratch area reaches a predefined size). The log buffer 350 thus clearly differs from any standard log file that provides a persistent memory structure, which is bound to be maintained permanently (i.e., until it is intentionally deleted by an explicit command or it is lost accidentally because of damage to the mass memory). The client log information is transmitted remotely for debugging purposes (typically, to the same server 105 in which the corresponding web application 310 is hosted).

This allows tracing the web application 310 on the client 110 as well. This is possible in any condition, even when the scripts 345 cannot write to the mass memory of the client 110 (for example, because of security constraints). Therefore, whenever an error is detected on the server 105 following its occurrence on the client 110, information is now available about the operations that were performed on the client 110.

This greatly facilitates the debugging of the web application 310 in the production environment, with a beneficial effect on its quality and reliability.

In one embodiment of the present invention, the tracing is controlled by a dedicated log function 355 of the scripts 345, which saves the client log information into an array implementing the log buffer 350. The log buffer 350 includes a series of client log items (for example, each one consisting of an array entry), which are added in succession by the log function 355. Preferably, the client log items relate to (user) actions that are performed on the client 110 with respect to the browser 335 (for example, the entering of data with the keyboard, the change of focus on the desktop, the click with the mouse on a button, and the like). Moreover, the client log items may relate to (functional) operations that are performed by the scripts 345 (for example, the invocation of a function, the entering of an error condition, and the like). Typically, each client log item relating to the actions includes a time-stamp, the identity of the user, a description of the action performed, and the like. Likewise, each client log item relating to the operations includes a time-stamp, an identifier of the function requesting the logging, a possible error code, and the like. The two types of client log items (for the actions and the operations) are automatically correlated thanks to their order in the log buffer 350; in this way, it is possible to have a picture of the temporal succession of the actions performed by the user of the client 110 with the contextual operations performed by the scripts 345.

Returning to the server 105, the engine 310 persists the client log information (received from each client 105 through the web server 305) by saving it into a corresponding client log file 360 (only one is shown for simplicity). An aggregator 365 accesses the server log file 330 and the client log file 360. The aggregator 365 combines these log files 330 and 360 into a global log file 370 by correlating the different (server and client) log items. Typically, the correlation is based on the temporal succession of the log items (for example, according to their time-stamps), on the users (for example, according to their names or IP addresses), and the like. In this way, the global log file 370 provides global log information about the execution of the web application 310 as a whole (i.e., both on the server 105 and on the client 110). This makes it possible to have a complete overview of the context in which any errors occurred.

The global log file 370 (or even the server log file 330 and the client log file 360 that are still distinct) can be used to debug the web application 310. For example, it is possible to follow the flow of operations on the client 110 that caused any error on the server 105. In addition or in the alternative, the same information may be used to drill-down the code of the web application 310 (by identifying the point corresponding to any error and then following its logical flow). Another use of the (client) log information is for reproducing the same conditions (on a dedicated test client) that caused the error for their analysis on the field.

Figure 4A:
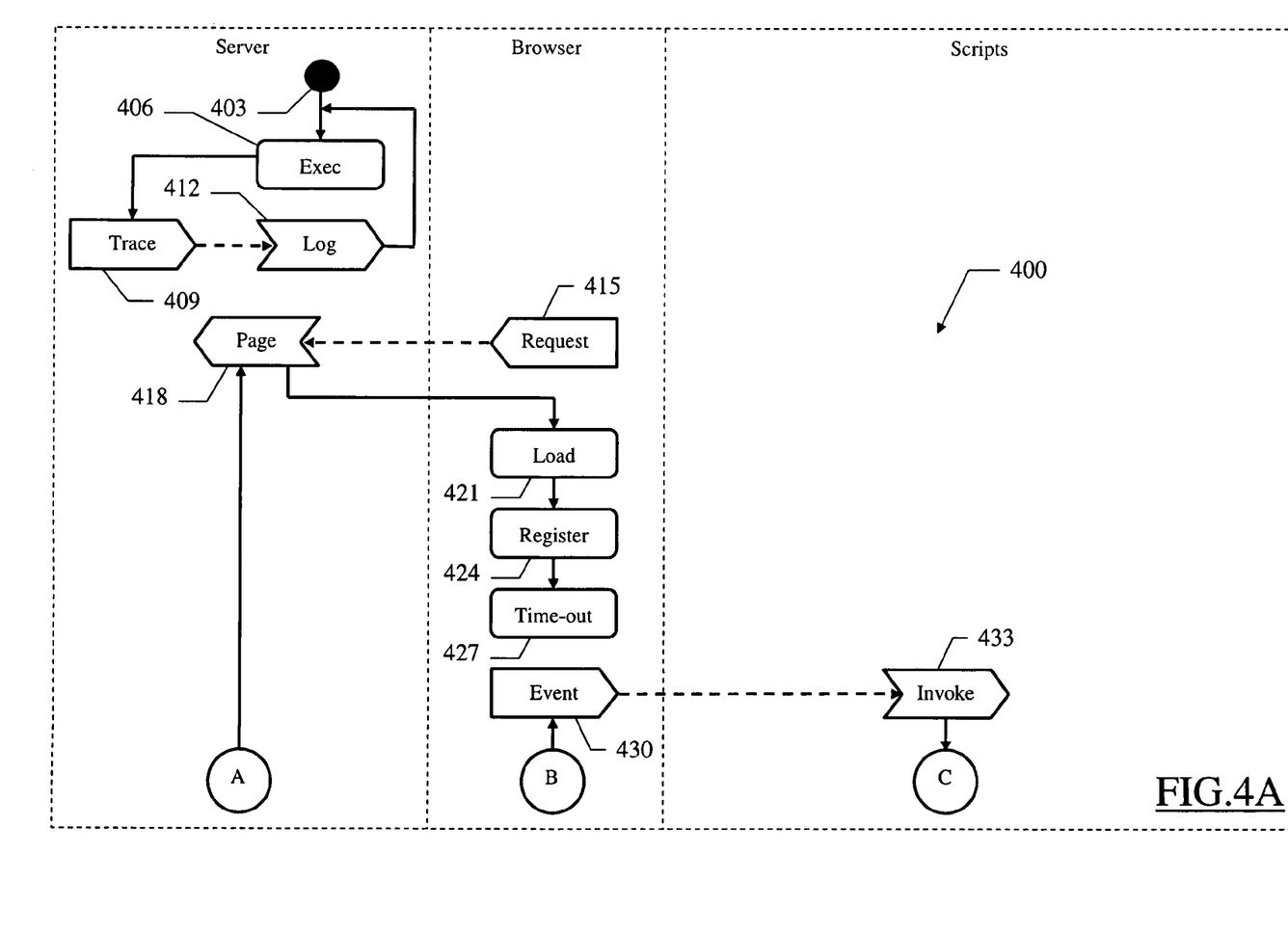
FIGS. 4A-4C show a flow diagram for an embodiment of the present invention.
Figure 4B:
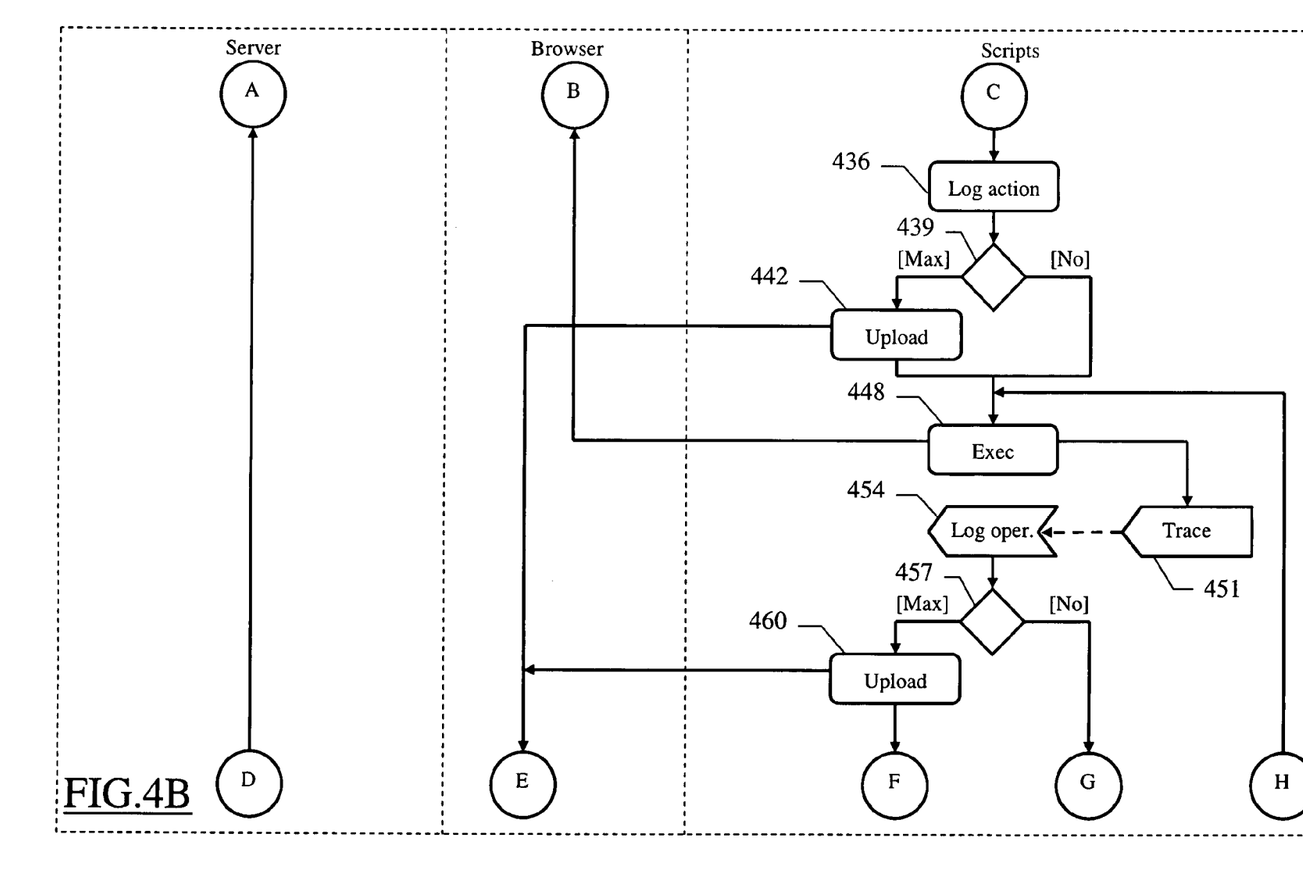
Figure 4C:
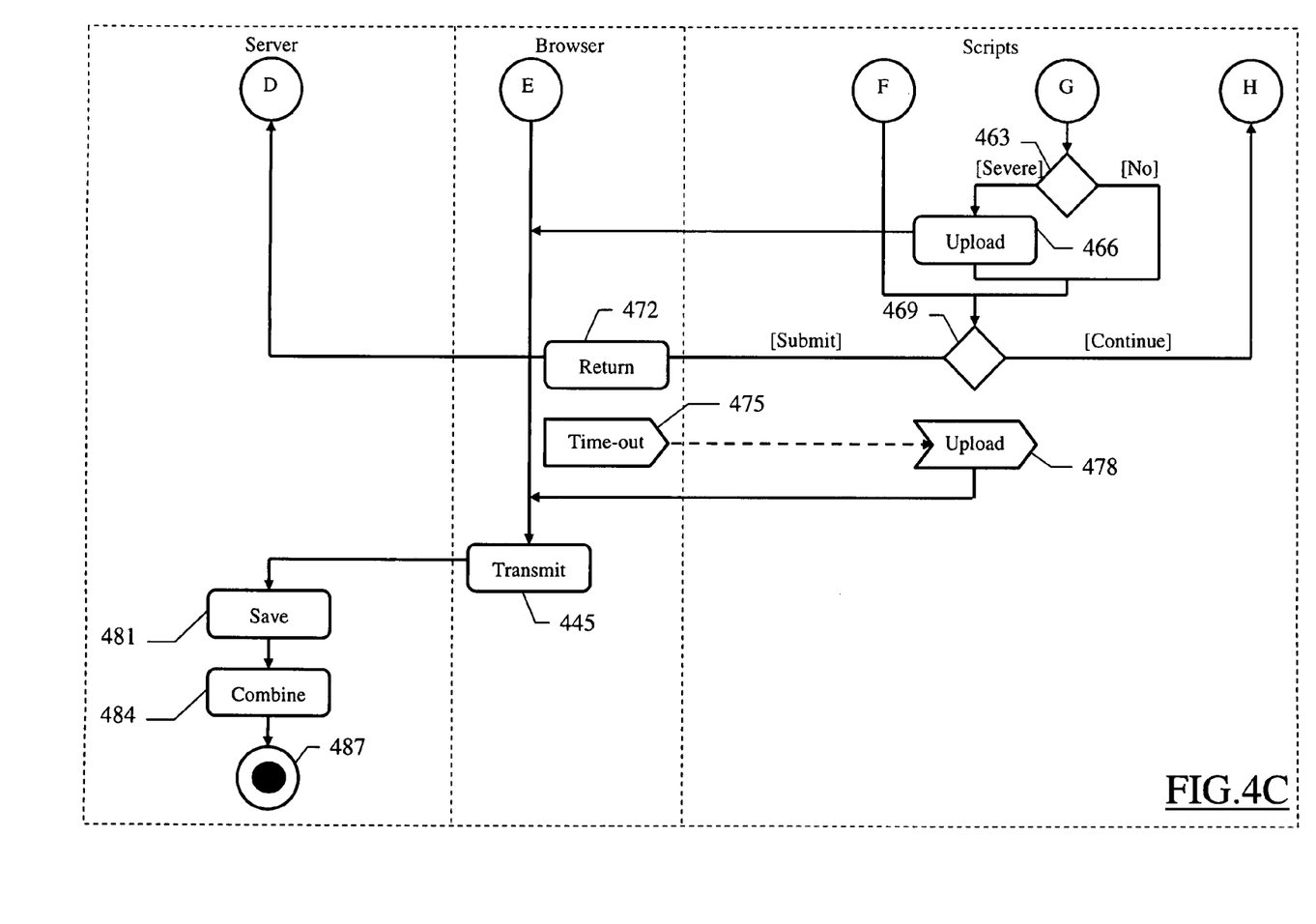

Moving to FIGS. 4A-4C, the logic flow of an exemplary process 400 implemented in the above-described system to trace execution of a web application (for its debugging) is represented.

The method begins at the start circle 403 in the portion of the server, and then passes to block 406 as soon as the engine of the web application is started. Whenever a tracing instruction is encountered at block 409, the corresponding server log item is generated and added to the server log file at block 412. The method then returns to block 406 to continue the execution of the engine.

Moving now to the browser of a generic client, a request for a specific web page is submitted at block 415 to the server (as indicated in its URL). The required web page is retrieved or created at block 418 on the server, and is then returned to the browser. Continuing to block 421, the browser loads the web page just received (by interpreting its HTML definition), so as to render it and load the corresponding scripts. The HTML definition of the web page also includes the specification of one or more (user) actions that cause the invocation of corresponding functions of the scripts (for example, the click on a corresponding button or the typing of the enter key); these actions are registered (for the corresponding functions of the scripts) with the browser at block 424. With reference now to block 427, a callback to the log function with a predefined time-out (such as every 1-2 minutes) is registered with the browser (as defined in a corresponding instruction of the HTML definition of the web page causing the call of a global method "SetTimeOut" of the browser).

As soon as any registered action is detected by the browser at block 430, the corresponding function of the scripts is invoked at block 433. In response thereto, at block 436 this (current) function at first generates a client log item for the action that caused its invocation; the client log item is then added to the log buffer, by invoking the log function passing the client log item as a parameter. A test is then made at block 439 to verify whether the size of the log buffer has reached a predefined maximum value (such as some number of megabytes). If so, at block 442 the log function is invoked to trigger the uploading of the log buffer to the server; the method then passes to block 445 in the portion of the browser (described in the following). At the same time, the flow of activity passes from block 442 to block 448; the same point is also reached from block 439 directly when the maximum value for the size of the log buffer has not been reached yet.

At this point, the execution of the current function continues according to its functional logic, until the current function ends, with the flow of activity then returning to block 430 waiting for the detection of a next registered action (causing the invocation of another function of the scripts). In the meanwhile, whenever a tracing instruction is encountered at block 451, the corresponding client log item is generated and added to the log buffer at block 454 (through the log function). A test is again made at block 457 to verify whether the size of the log buffer has reached the maximum value. If so, at block 460 the log function is invoked as above to trigger the uploading of the log buffer to the server, with the method then passing to block 445. At the same time, the flow of activity passes from block 460 to block 469 (described in the following). The uploading of the log buffer according to its size (either at block 442 or at block 460) prevents any loss of the client log information, due to an overflow of the working memory that is available to the scripts.

Referring back to block 457, when the maximum value for the size of the log buffer has not been reached yet, the test block 463 is entered. If a severe error occurred during the execution of the current function (which severe error caused its tracing into the log buffer), the log function is invoked in any case at block 466, so as to trigger the uploading of the log buffer, with the method then passing to block 445. At the same time, the flow of activity passes from block 466 to block 469; the same point is instead reached directly from block 463 when the tracing of the current function was not due to any severe error thereof. This additional feature ensures that no client log information is lost, even when the scripts suffer severe errors (which may induce the user to force a shutdown of the browser with the destruction of all its working memory structures, including the log buffer).

Considering now block 469, the flow of activity branches according to the operation to be performed by the current function. If the processing on the client has been completed and a new request has to be submitted to the server, the browser at block 472 returns the relevant information to the server (such as the URLs of another web page, user's data entered into a form, and the like). The method then goes back to block 418, where a corresponding new web page is retrieved or created, and then downloaded to the browser (to repeat the same operations described above). Conversely, if further operations should be performed on the client, the method returns to block 448 to continue the execution of the current function.

In a completely asynchronous way, the method enters block 475 in the portion of the browser as soon as the time-out of the registered callback to the log function expires (for the first time or after a previous expiration); the same point is also reached irrespectively of the time elapsed when the browser is closed (by selecting a corresponding command). In response thereto, the browser at block 478 invokes the log function to trigger the uploading of the log buffer, with the method then passing to block 445 as above. In this way, the client log information is provided to the server periodically, and in any case at the end of any working session on the client.

With reference now to block 445, the browser transmits the client log information saved in the log buffer to the server (with the log buffer then purged). Moving to the portion of the server at block 481, the client log information so received is saved into the corresponding client log file. The client log file and the server log file are then combined into the global log file at block 484 (for use in the debugging of the web application, either on the server or on any other computer). The flow of activity then ends at the stop circle 487.

Naturally, in order to satisfy local and specific requirements, a person of ordinary skill in the art may apply to the embodiments described above many logical and/or physical modifications and alterations. For example, although the present invention have been described with a certain degree of particularity with reference to preferred embodiment(s) thereof, it should be understood that various omissions, substitutions, and changes in the form and details as well as other embodiments are possible. Particularly, the described embodiments may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the present invention may be incorporated in any other embodiment as a matter of general design choice.

Particularly, the described embodiments lend themselves to be implemented with an equivalent method (by using similar steps, removing some steps that are non-essential, or adding further optional steps); moreover, the steps may be performed in a different order, concurrently, or in an interleaved way (at least in part).

In any case, the above-described (server and client) log information is merely illustrative, and is not to be interpreted in a limitative manner; for example, similar considerations apply if different or additional information is inserted in every server and/or client log item (such as an indication of a corresponding code line).

The server log information and the client log information may be correlated in any other way (for example, by implementing a mechanism for synchronizing the clocks of the server and the client). In any case, nothing prevents using the client log information alone (for example, simply to reproduce the same error conditions). More generally, the possibility of transmitting the client log information from the client remotely to any other computer—even different from the server hosting the corresponding web application—is not excluded.

Even though in the preceding description reference has been made expressly to web applications (and particularly to the tracing of the scripts associated with web pages) this is in no way limiting; indeed, the present invention may also be applied to any other server and/or client component of the web application (such as action scripts, VisualBasic programs, and the like), or more generally to any other application adapted to run in a distributed environment.

Similar considerations apply if the client log information relates to alternative actions performed on the client (such as the opening of a frame) or to alternative operations performed by the scripts (such as the exit of a function). However, nothing prevents tracing the actions only, the operations only, or more generally any other type of events or combination thereof relating to the execution of the scripts (such as system events).

In one alternative embodiment of the present invention, a dedicated listener is used to detect the actions to be traced.

Alternative techniques may be used to control the transmission of the client log information to the server periodically (for example, by a dedicated counter).

Likewise, the transmission of the client log information to the server may be triggered by the reaching of a predefined threshold by any indicator of a filling rate of the log buffer (for example, consisting of the number of written entries thereof).

It should be readily apparent that the present invention lends itself to be implemented with any other policy for controlling the transmission of the client log information to the server. For example, the operation may be performed only at the closure of the browser, only in response to the errors (irrespectively of their severity), and the like.

Similar considerations apply if the program (which may be used to implement an embodiment of the present invention) is structured in a different way, or if additional modules or functions are provided; likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-readable medium; the medium can be any element suitable to contain, store, communicate, propagate, or transfer the program. For example, the medium may be of the electronic, magnetic, optical, electromagnetic, infrared, or semiconductor type; examples of such a medium are fixed disks (where the program can be pre-loaded), removable disks, tapes, cards, wires, fibers, wireless connections, networks, broadcast waves, and the like. In any case, the present invention lends itself to be implemented with a hardware structure (for example, integrated in a chip of semiconductor material), or with a combination of software and hardware.

The proposed method may be carried out on a system having a different architecture or including equivalent units (for example, based on a local network). Moreover, each computer may include similar elements (such as cache memories temporarily storing the programs or parts thereof to reduce accesses to the mass memory during execution); in any case, it is possible to replace the computer with any code execution entity (such as a PDA, a mobile phone, and the like), or with a combination thereof (such as a multi-tier server architecture, a grid computing infrastructure, and the like).

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for debugging a software application in a data processing system that includes a server entity and a plurality of client entities, for at least one of the client entities the method comprising:
 accessing a server component of the software application that is running on the server entity;
 downloading a client component of the software application from the server entity to the one client entity, the client component comprising:
  at least one script that performs at least one function of the client component, and
  a log function that traces an execution of the at least one function;
 executing, by a processor, the client component that includes the at least one function on the one client entity;
 tracing, by the log function, the at least one function of the script in response to executing the at least one function;
 responsive to the tracing, saving client log information in a log buffer on the one client entity relating to at least the execution of the at least one function of the script, the log buffer being a non-persistent memory structure of the client component that is maintained in the working memory of the one client entity; and
 transmitting the client log information saved in the log buffer from the one client entity to the server entity for use in the debugging of the software application, and then purging the log buffer,
 wherein the non-persistent memory structure is an array, the log buffer comprises a series of client log items, and each of the client log items is an array entry, and
 the saving comprises adding one client log item to the log buffer by the log function passing the one client log item as a parameter.

2. The method according to claim 1, further comprising:
 saving server log information relating to execution of the server component on the server entity; and
 combining the client log information with the server log information so as to produce global log information of the software application for use in the debugging of the software application.

3. The method according to claim 1,
 wherein the software application is a web application, and the at least one script is associated with a web page.

4. The method according to claim 1, wherein the saving comprises:
 saving client log information relating to user actions performed on the one client entity; and
 saving client log information relating to functional operations performed by the client component.

5. The method according to claim 4, wherein the saving of the client log information relating to the user actions performed on the one client entity comprises:
 registering a set of predefined actions to be monitored with a browser so as to cause the browser to trigger execution of a corresponding function of the client component in response to detection of one of the registered actions, and adding, by the triggered function, an indication of the detected registered action to the non-persistent memory structure.

6. The method according to claim 1, wherein the transmitting comprises transmitting the client log information periodically.

7. The method according to claim 6, wherein the transmitting of the client log information periodically comprises:
registering an invocation of a transmission function of the client component with a browser, the invocation being registered with a selected time-out so as to cause the browser to invoke the transmission function in response to each expiration of the time-out; and
transmitting, by the transmission function, the client log information.

8. The method according to claim 1, wherein the transmitting comprises:
monitoring a filling rate of the memory structure; and
transmitting the client log information in response to the filling rate reaching a threshold.

9. The method according to claim 1, wherein the transmitting comprises:
detecting an error condition of the client component; and
transmitting the client log information in response to the detection of the error condition.

10. A non-transitory computer-readable storage medium encoded with a computer program for debugging a software application in a data processing system that comprises a server entity and a plurality of client entities, the computer program comprising instructions for performing a method comprising:
accessing a server component of the software application that is running on the server entity;
downloading a client component of the software application from the server entity to the one client entity, the client component comprising:
at least one script that performs at least one function of the client component, and
a log function that traces an execution of the at least one function;
executing, by a processor, the client component that includes the at least one function on the one client entity;
tracing, by the log function, the at least one function of the script in response to executing the at least one function;
responsive to the tracing, saving client log information in a log buffer on the one client entity relating to at least the execution of the at least one function of the script, the log buffer being a non-persistent memory structure of the client component that is maintained in the working memory of the one client entity; and
transmitting the client log information saved in the log buffer from the one client entity to the server entity for use in the debugging of the software application, and then purging the log buffer,
wherein the non-persistent memory structure is an array, the log buffer comprises a series of client log items, and each of the client log items is an array entry, and
the saving comprises adding one client log item to the log buffer by the log function passing the one client log item as a parameter.

11. The non-transitory computer-readable storage medium according to claim 10,
wherein the software application is a web application, and the at least one script is associated with a web page.

12. The non-transitory computer-readable storage medium according to claim 10, wherein the saving comprises:
saving client log information relating to user actions performed on the one client entity; and
saving client log information relating to functional operations performed by the client component.

13. The non-transitory computer-readable storage medium according to claim 10, wherein the transmitting comprises:
monitoring a filling rate of the memory structure; and
transmitting the client log information in response to the filling rate reaching a threshold.

14. A system for debugging a software application in a data processing system that comprises a server entity and a plurality of client entities, the system comprising:
a memory; and
a processor communicatively coupled to the memory, the processor being configured to perform a method comprising:
accessing a server component of the software application that is running on the server entity;
downloading a client component of the software application from the server entity to the one client entity;
executing the client component on the one client entity, the client component comprising:
at least one script that performs at least one function of the client component, and
a log function that traces an execution of the at least one function;
responsive to the tracing, saving client log information in a log buffer on the one client entity relating to at least the execution of the at least one function of the script, the log buffer being a non-persistent memory structure of the client component that is maintained in the working memory of the one client entity; and
transmitting the client log information saved in the log buffer from the one client entity to the server entity for use in the debugging of the software application, and then purging the log buffer,
wherein the non-persistent memory structure is an array, the log buffer comprises a series of client log items, and each of the client log items is an array entry, and
the saving comprises adding one client log item to the log buffer by the log function passing the one client log item as a parameter.

15. The system according to claim 14,
wherein the software application is a web application, and the at least one script is associated with-a web page.

16. The system according to claim 14, wherein the saving comprises:
saving client log information relating to user actions performed on the one client entity; and
saving client log information relating to functional operations performed by the client component.

17. The system according to claim 14, wherein the transmitting comprises:
monitoring a filling rate of the memory structure; and
transmitting the client log information in response to the filling rate reaching a threshold.

* * * * *